July 15, 1952 E. SAUER 2,603,358
KITCHEN UTENSIL HOLDER
Filed Nov. 18, 1948
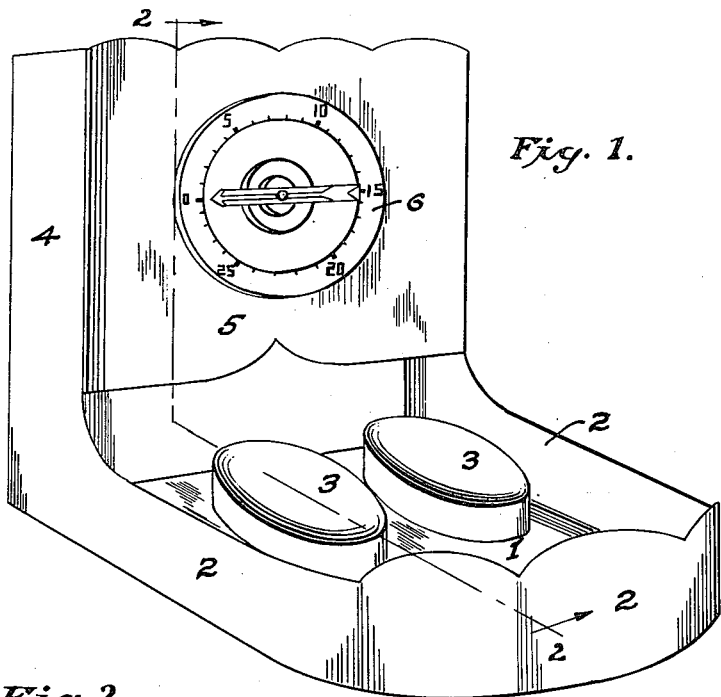
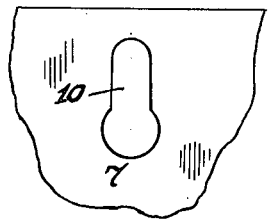
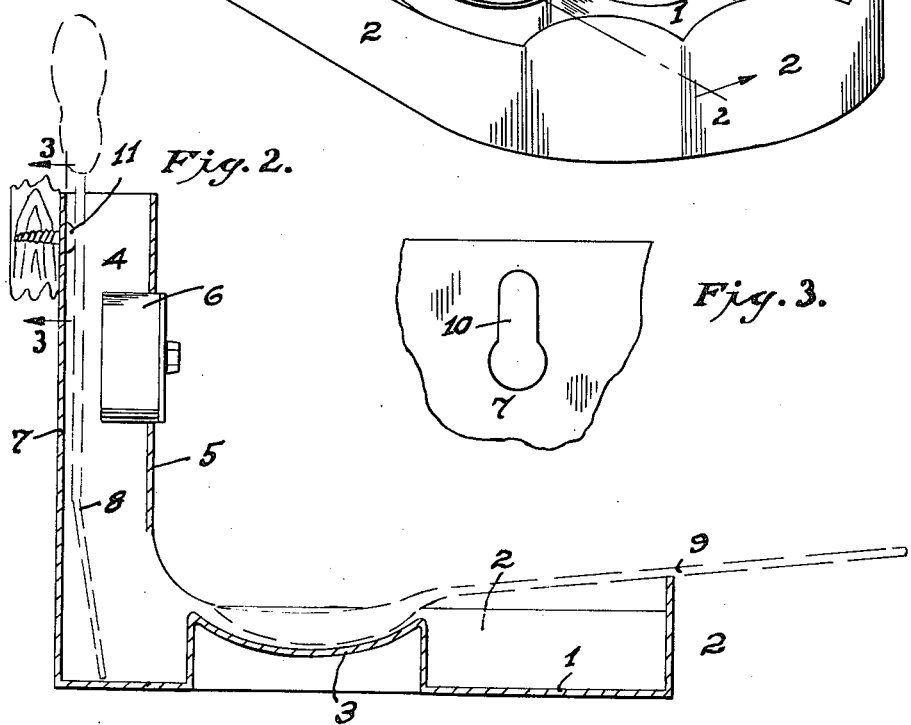
INVENTOR.
EDNA SAUER
BY
Atty.

Patented July 15, 1952

2,603,358

UNITED STATES PATENT OFFICE 2,603,358

KITCHEN UTENSIL HOLDER

Edna Sauer, Wichita, Kans.

Application November 18, 1948, Serial No. 60,785

1 Claim. (Cl. 211—60)

This invention relates to a kitchen utensil holder adapted to receive spoons, forks, ladles, knives, or any other similar utensil used in a kitchen or around a cook stove and has provision for receiving such utensils that are shaped more or less like the shape of the utensil so as to automatically accumulate and hold any drippings of cooking fats, batters, soups or any like materials that are being cooked or handled in a kitchen or around a cook stove to prevent the same from soiling the kitchen tables or table coverings.

The article may be made of sheet metal decorated in any well known manner, of plastic or like material or of any other sheet material suitable for the purpose which can be molded or shaped as above described.

The article is somewhat L-shaped with the lower leg of the L provided with the shaped supports for the various utensils and the vertical leg of the L having a thin box section in which may be placed cake turners, long handled forks or spoons so that the soiled ends will rest on the lower leg of the L, or they may be suspended in the box section according to their size and shape, so that any drippings from them will be received in the lower leg of the L.

Provision is also to support the utensil holder on a suitable wall space when desired so that it may easily be removed for emptying and cleaning after use, or owing to the flat bottom of the lower leg of the L it may be rested on any flat surface such as a table top, a shelf or any support available.

The front face of the vertical leg of the L may be provided with a time clock having an alarm so that it may be set by the cook to give an alarm at any time set to notify of a specified cooking or baking time, these clocks are available when wanted and are no part of this invention other than the placement of the clock on the utensil holder in the manner described.

It is therefore, a principle object of the invention to provide a kitchen utensil holder having an L shaped form with supports in the bottom leg of the L for isolating utensils and for collecting any dripping therefrom.

It is also an object of the invention to provide a kitchen utensil holder having an L-shape the vertical leg of the L providing space for cake turners, long handle forks or spoons, and the front face of the vertical leg of the L being provided with a time clock having an alarm which when set to notify the operator of the expiration of any time previously set.

Other objects and advantages will become apparent as the description progresses, reference being now had to the drawings accompanying this specification wherein the utensil holder is shown in a preferred form and wherein like characters represent like parts in the several views.

Figure 1 is a front perspective of the utensil holder clearly showing the lower leg of the L with the sides turned up to form an open top receptacle and with two utensil supports shaped to receive and hold two spoons, the vertical leg of the holder showing the thin box section and with the time clock in place of the front.

Figure 2 is a sectional elevation taken on substantially the line 2—2 of Figure 1 and showing in dotted lines a cake turner placed in the box section and a spoon resting on one of the supports.

Figure 3 is a detail view taken on substantially the line 3—3 of Figure 2 showing the slotted opening in the back wall of the vertical leg by means of which the holder may be hung on a suitable nail or screw on a wall.

The numeral 1 represents the bottom wall of the lower leg of the L-shaped holder, 2 represents the edges of the bottom wall turned up to form an open top receptacle and 3 represents the shaped supports for spoons that are shown in Figure 2 as being formed integral with the bottom wall of the holder. 4 represents the side wall of the vertical leg of the L-shaped holder and 5 is the front wall of the vertical leg. 6 represents the time clock positioned about centrally of the front panel for easy accessibility and 7 is the back wall of the vertical leg of the holder. 8 is the dotted representation of a cake turner resting in the vertical box section and 9 represents the dotted spoon resting on the support 3 in Figure 2. 10 is the elongated opening in the wall 7 by means of which the holder may be suspended on a screw or nail as shown clearly in Figure 2 at 11.

The drawings so clearly show the utensil holder that a further description of it and its various uses seems unnecessary, except to mention that the use of such a holder in a kitchen will tend to neatness and cleanliness on the part of the operator and will accumulate any drippings from the utensils that would otherwise more or less muss up the table top or the top of a gas or electric range and hold them in the open top receptacle formed by the lower leg of the L until such time as it is convenient to empty them and clean the receptacle.

What I claim as new and desire to secure by Letters Patent is:

A kitchen utensil drip collecting holder comprising a vertically disposed utensil receiving compartment, an open end at the top of the compartment, a horizontally disposed utensil compartment extending from the bottom portion of the vertically disposed compartment, a front closure member on the horizontally disposed compartment, said vertically disposed compartment opening at the bottom thereof into the horizontally disposed compartment and forming a common accumulating chamber for drippings from the utensils in both the vertically and horizontally disposed compartments, and a raised portion in the horizontally disposed compartment for reception of the oval portion of a utensil.

EDNA SAUER.

REFERENCES CITED

The following references are of record in the file of this patent:

UNITED STATES PATENTS

| Number | Name | Date |
| --- | --- | --- |
| D. 48,039 | Niper | Oct. 26, 1915 |
| 638,998 | Stueve | Dec. 12, 1899 |
| 1,661,787 | Ohisholm | Mar. 6, 1928 |
| 2,436,044 | Hudash | Feb. 17, 1948 |